INVENTORS
MANUEL C. LANGTRY
STEPHEN A. BANKS

BY
Cushman, Darby & Cushman
ATTORNEYS

INVENTORS
MANUEL C. LANGTRY
STEPHEN A. BANKS
BY Cushman, Darby & Cushman
ATTORNEYS

INVENTOR
MANUEL C. LANGTRY
STEPHEN A. BANKS

BY Cushman, Darby & Cushman
ATTORNEYS

CHARACTER WRITING TECHNIQUE AND SYMBOL GENERATION

Filed May 10, 1966 Sheet 4 of 7

INVENTORS
MANUEL C. LANGTRY
STEPHEN A. BANKS

BY Cushman, Darby & Cushman
ATTORNEYS

INVENTORS
MANUEL C. LANGTRY
STEPHEN A. BANKS

BY Cushman, Darby & Cushman
ATTORNEYS

INVENTORS
MANUEL C. LANGTRY
STHPHEN A. BANKS

BY Cushman, Darby & Cushman
ATTORNEYS

CHARACTER WRITING TECHNIQUE AND SYMBOL GENERATION

INVENTORS
MANUEL C. LANGTRY
STEPHEN A. BANKS

BY Cushman, Darby & Cushman
ATTORNEYS

3,438,001
CHARACTER WRITING TECHNIQUE AND SYMBOL GENERATION

Manuel C. Langtry, Kronberg, Taunus, Germany, and Stephen A. Banks, Torrance, Calif., assignors to Control Data Corporation, Minneapolis, Minn., a corporation of Minnesota Filed May 10, 1966, Ser. No. 548,940
Int. Cl. G11b *13/00*
U.S. Cl. 340—172.5 28 Claims

ABSTRACT OF THE DISCLOSURE

Apparatus for displaying digital information contained at M storage elements for display at M visual displays. A de-coder and converter are utilized to convert P bit words to N bit characters which are suitable for display at the visual displays on a character space comprising an A x B matrix. Memories responsive to the converter are provided and a read sequencer, sense amplifiers and a register are associated with the memory for serially transferring the data from the memory to the display consoles.

This invention relates generally to apparatus for displaying digital data at a multiplicity of display consoles, and in particular this invention relates to an improved apparatus and method for economically distributing digital data from a central location to a plurality of display consoles where the data is presented visually. This apparatus also relates to an improved apparatus and method for representing and converting digital data to a code which can be efficiently utilized by a cathode ray tube display device.

One of the more important problems confronting computer technology is that of presenting digital information within the computer to display consoles where the information can be immediately recognized by the human operator. Further, there is a need to display digital information contained in one portion of the computer memory at one display console and to display the digital information contained in another portion of the computer memory at another display console. For example, it may be desirable to display the information contained in sixteen different sections of the computer memory at sixteen different display consoles. This is particularly useful when there are multiple, simultaneous users of a computer complex.

Among the more important problems arising in attacking the above-mentioned problem is that of representing the digital information stored within the computer in an economical manner to facilitate the representation of the digital data on a cathode ray display tube.

Accordingly, it is an object of the invention to provide and improved apparatus for distributing digital information to a multiplicity of display sites.

It is another object of the invention to provide an improved apparatus for converting digital information stored within a computer to a code suitable for economically representing the information upon a cathode ray display tube.

It is a further object of this invention to simultaneously display on a plurality of display consoles different information from one another.

It is a further object of this invention to provide an improved method for positioning a cathode ray tube beam so that a character representing digital information is economically and effectively displayed at the tube.

It is a further object of this invention to provide improved apparatus for continuously transferring digital information to a plurality of display consoles so that the presentation of the information at the consoles is satisfactory for visual display.

A brief description of an illustrative embodiment of the invention for accomplishing the above-mentioned objects will now be given.

Each character to be represented on the display tube may require a six-bit word to represent it within the computer memory. Since six bits are employed to represent each character, it is possible to have sixty-four characters within the character set although normally only around fifty are employed. In order to represent each character on the display tube, thirty-five dots or elements may be reserved for each character on the display tube surface. These thirty-five dots may be arranged in a 7 x 5 pattern or matrix, each matrix being called a character space. There are typically forty character spaces per horizontal line across the display raster and twenty-five lines of characters vertically down the raster, thereby resulting in one thousand characters per display tube.

The six-bit words may be read from the computer memory in groups—in other words, four, six-bit words are typically read from the computer memory for each reference thereto. The four words are serially passed through conversion network which converts each six-bit word to a thirty-five-bit character suitable for representation on the display tube. This thirty-five-bit character or code is employed to regulate the unblanking or intensity of each of the cathode ray tube beams. Deflection wave forms for the cathode ray tubes are also supplied and synchronized with each of the thirty-five-bit characters.

After each six-bit word is converted to a thirty-five-bit character, the thirty-five-bit character may be loaded into one of two "corner-turner" memories. The corner-turner memory is so called because it is effectively loaded from one direction and unloaded at a direction perpendicular to the loading direction. If sixteen displays are employed in a particular application, the corner-turner memory will be loaded sixteen consecutive times with thirty-five-bit characters before the memory contents will be unloaded and displayed at the display consoles.

Since the corner-turner memory is unloaded perpendicularly with respect to the direction it was loaded, there are sixteen output lines to the sixteen different display points where each output line passes, serially, the thirty-five bits comprising the particular character destined for its associated display. While one of the corner-turner memories is being loaded, the other is being unloaded. Operation of these memories proceeds on a ping-pong basis as information is transferred to the displays from the computer memory. A single memory may be employed in place of the two memories. This depends on the speed of the logic circuits, main memory, number of characters per CRT and the refresh rate for the CRT.

As can be seen from the above brief description of the invention, an advantageous apparatus has been described for economically distributing digital information from a plurality of discrete stations (for example, different memory locations of a computer memory) to respective associated displays. Further, a useful method for representing the digital information within the computer at the display has also been described.

Other objects and advantages of this invention will become apparent to those of ordinary skill in the art upon reading the appended claims and the following detailed description of an illustrative embodiment of the invention, in conjunction with the drawings, in which:

FIGURE 1 is a system block diagram of an illustrative embodiment of the invention;

FIGURES 2 and 2A, taken together, are a more detailed system block diagram than is shown in FIGURE 1;

Figures 3, 4:
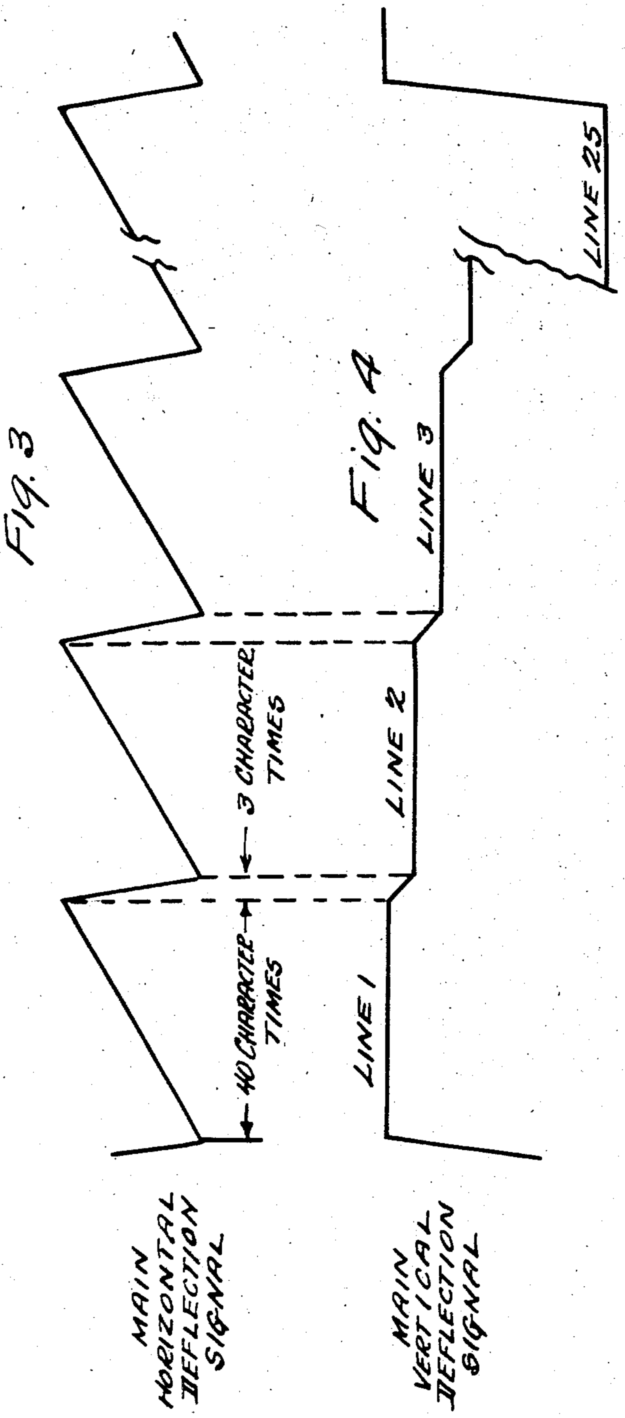
FIGURE 3 is an analog ramp waveform employed in one embodiment of the invention to control the main horizontal winding of the deflection yoke of the display tube.
FIGURE 4 is an analog staircase waveform employed in conjunction with the waveform shown in FIGURE 3 to control the main vertical winding of the deflection yoke of the display tube.
Figure 7:
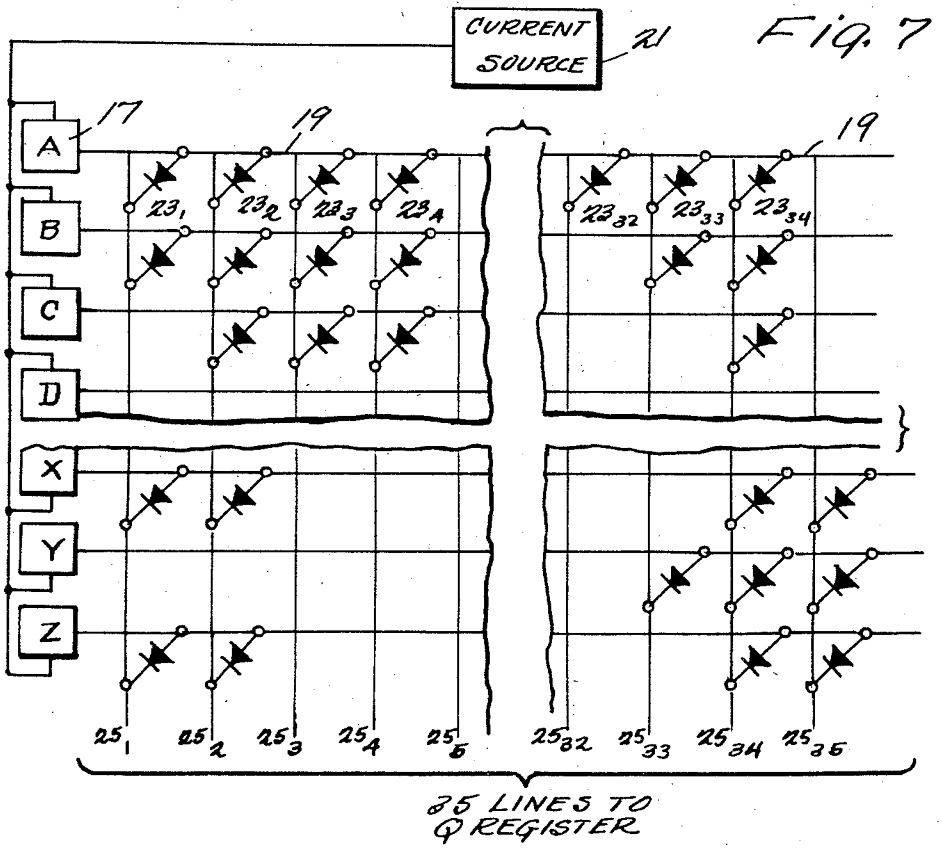
Figure 8:
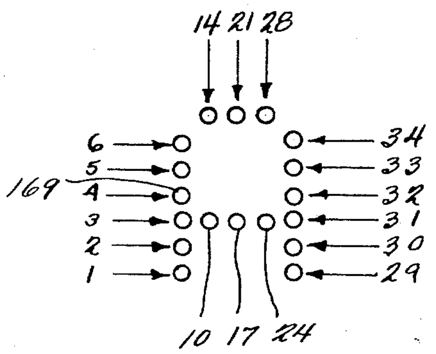
Figure 9:
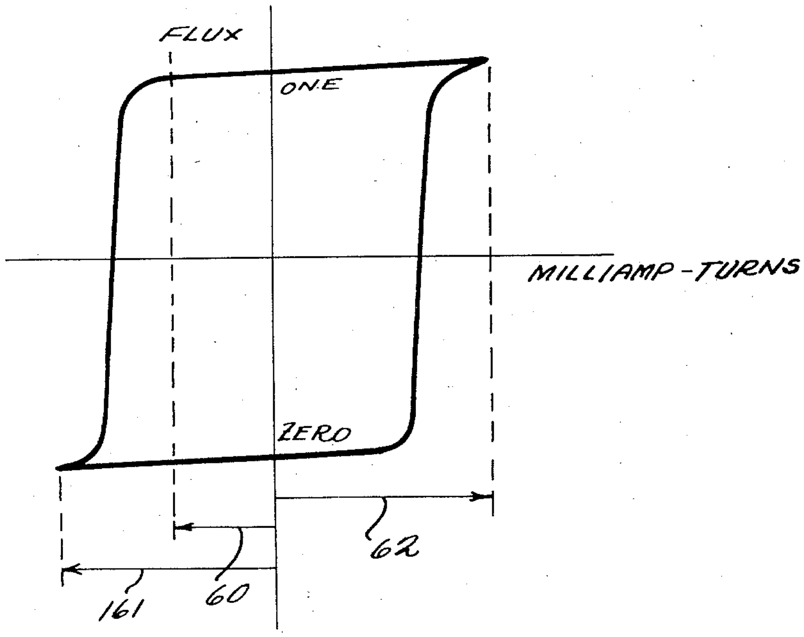
Figure 14:
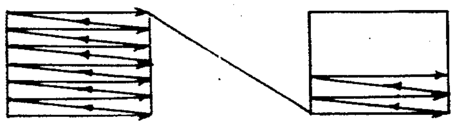
Figure 10:
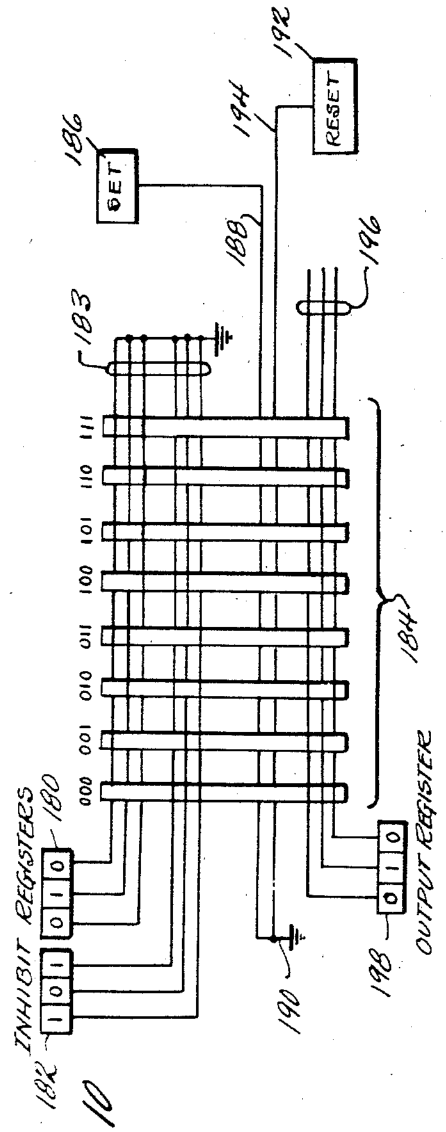
Figure 11:
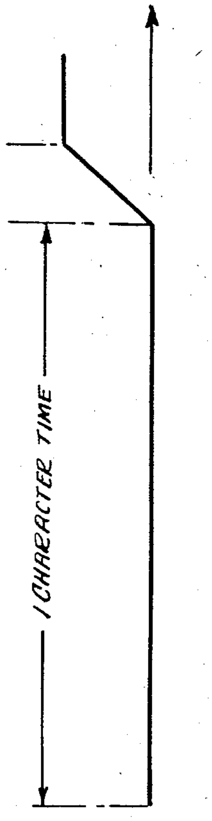
Figure 12:
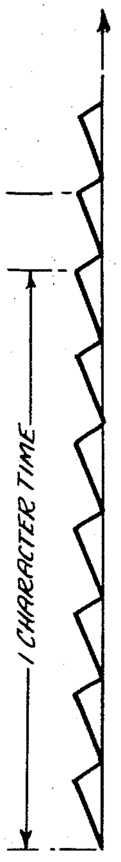
Figure 13:
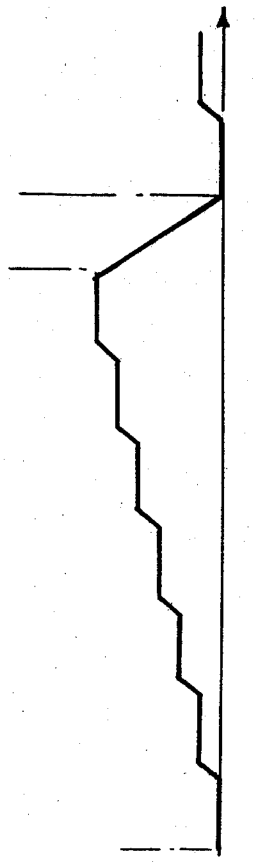

FIGURE 7 diagrammatically illustrates a diode matrix converter, which may be employed in the illustrative embodiment of the invention;

FIGURE 8 illustrates a typical representation of the character A at a display console;

FIGURE 9 is a graphical illustration of the hysteresis curve of a typical core used in the corner-turner memory of the invention;

FIGURE 10 diagrammatically illustrates a rope memory, which may be employed in the illustrative embodiment of the invention;

FIGURE 11 is an analog staircase waveform employed in a further embodiment of the invention, to control the main horizontal winding of the deflection yoke of the display tube;

FIGURES 12 and 13 are analog waveforms employed in conjunction with the waveforms shown in FIGURES 4 and 11 to produce the necessary control for generating a character at the display tube; and FIGURE 14 diagrammatically represents the travel of the cathode ray tube beam for the further embodiment of the invention using the waveforms shown in FIGURES 4 and 11–13.

Figure 1:
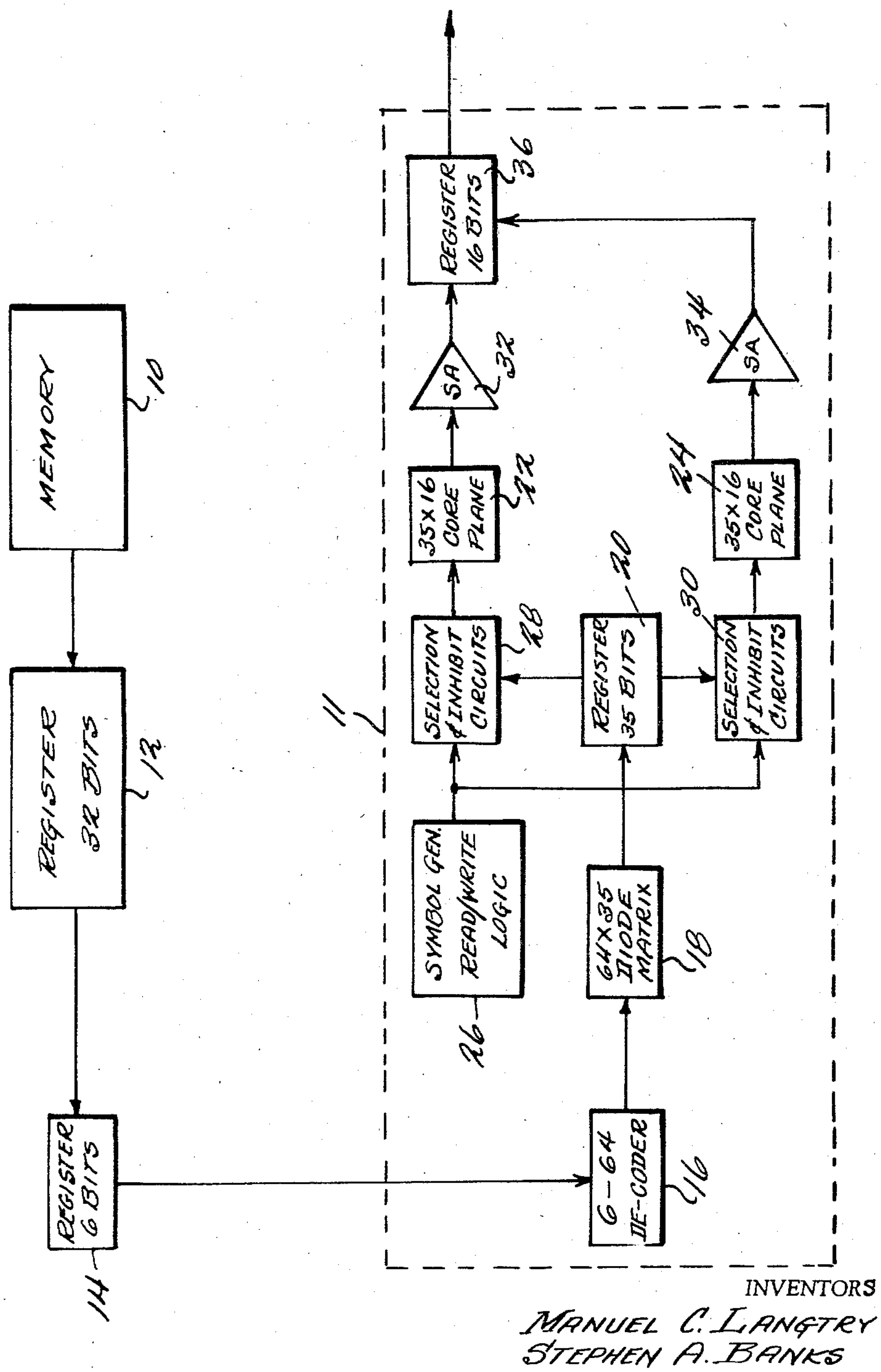

The computer memory, which may be the main or an auxiliary memory, is shown at 10, see FIGURE 1. Each storage element of the memory 10 contains thirty-two bits and is capable of storing four, eight-bit words where six of the bits are employed for character representation and the remaining two are employed for control purposes. When the information contained within the memory 10 is to be displayed, the contents of the thirty-two-bit storage elements are sequentially transferred to register 12 where they are held while each word within the thirty-two bits is processed.

For purposes of illustration of one embodiment of the invention, sixteen display consoles are employed. This means that four main memory accesses typically are required to obtain one character for all sixteen displays. The memory cycle time is typically 6.4 microseconds, and each access brings out four words.

Register 14 is a six-bit register, each six-bit word in register 12 being sequentially transferred to register 14. The register 14 presents the six bits contained therein to a de-coder 16 which has six input lines and 64 output lines (not shown in FIGURE 1). One of the 64 output lines will be activated, depending on the particular combination of six bits presented to the input of de-coder 16.

The sixty-four outputs from de-coder 16 are presented to a converter means 18, which typically comprises a 64 x 35 diode matrix, which is described in more detail hereinafter. Other alternative embodiments of converter 18 will also be discussed hereinafter. The converter 18 transforms or converts the active one of its sixty-four input lines to a thirty-five-bit character, the configuration of which depends on which of the sixty-four input lines have been activated. There are thirty-five output lines available along one edge of the matrix, which provide for parallel loading of a register 20, a thirty-five-bit register. The contents of register 20 are loaded into either a corner-turner memory 22 or a corner-turner memory 24 depending on which of these memories is being loaded at the particular time. While one of the memories 22 or 24 is being loaded with information from the memory 10, the other is being unloaded and supplying display information to the displays. In this illustrative embodiment, sixteen displays are chosen to illustrate the invention. A symbol generator read/write logic circuit 26 controls which of the memories 22 or 24 will be loaded from the register 20. These memories are typically core planes. Selection and inhibit circuits 28 and 30 are controlled by logic circuit 26 to gate the information from register 20 to the appropriate core memory.

Each of the corner-turner memories 22 and 24 are identical in structure and operation, therefore, a brief description of one will suffice for both. The memory 22 may have thirty-five input lines thereby permitting parallel loading from the register 20. As each six-bit word from memory 10 is converted by the converter 18, a new thirty-five-bit character is loaded into the register 20. Each new thirty-five-bit character is immediately loaded into a unique thirty-five-bit location within the memory 22. After sixteen, thirty-five-bit characters have been loaded into memory 22, the unloading and transfer of information to the sixteen displays commences.

Each character represented at the display preferably employs thirty-five bits for adequate, economical representation as has been explained before. The first bits of each thirty-five-bit character destined for the sixteen different displays are simultaneously transmitted over sixteen output lines from the core memory 22. These sixteen output lines each contain a sense amplifier 32 for amplifying the memory output. The outputs of amplifier 32 are loaded to a sixteen-bit register 36 having sixteen outputs which are distributed as character unblank signals to each data display console.

The process of transferring six-bit words into register 14, de-coding into one of sixty-four lines, passing through the converter 18 into register 20 and then into storage in the memory 22 or 24 is repeated for sixteen characters. The core plane 22 or 24 then contains enough information to paint one 7 x 5 character on each of sixteen displays.

During the period that one core plane is being loaded, the other core plane is being unloaded in a "corner-turning" fashion, that is, the information is effectively read out in thirty-five accesses at a right angle to the direction it was written in. Each of the thirty-five read accesses retrieves one dot of the 7 x 5 character for each display. The read operation is destructive so that after the thirty-fifth access the core plane has been cleared and it can immediately be loaded again.

In a system where either or both the number of characters per display and the time per character can be reduced, it might be possible to operate with a single corner-turner memory. The single corner-turner memory would be completely loaded and unloaded for each sixteen characters respectively displayed at the sixteen consoles. Between each paint cycle at the display console, there would be a wait cycle while the corner-turner memory is being loaded with the next character.

The positioning information to be supplied to each display comes from digital-to-analog converters or drive circuits. The drive circuits for positioning the beam at each display tube will be described in more detail hereinafter.

The total apparatus contained within the block 11 is referred to as a symbol generator and will be so designated in this specification and claims. The positioning signals sent to each display are identical thereby resulting in the beams at all displays being synchronized that is, all beams scan the same character space within the raster simultaneously. Only the unblanking information is unique to each display.

Figure 2:
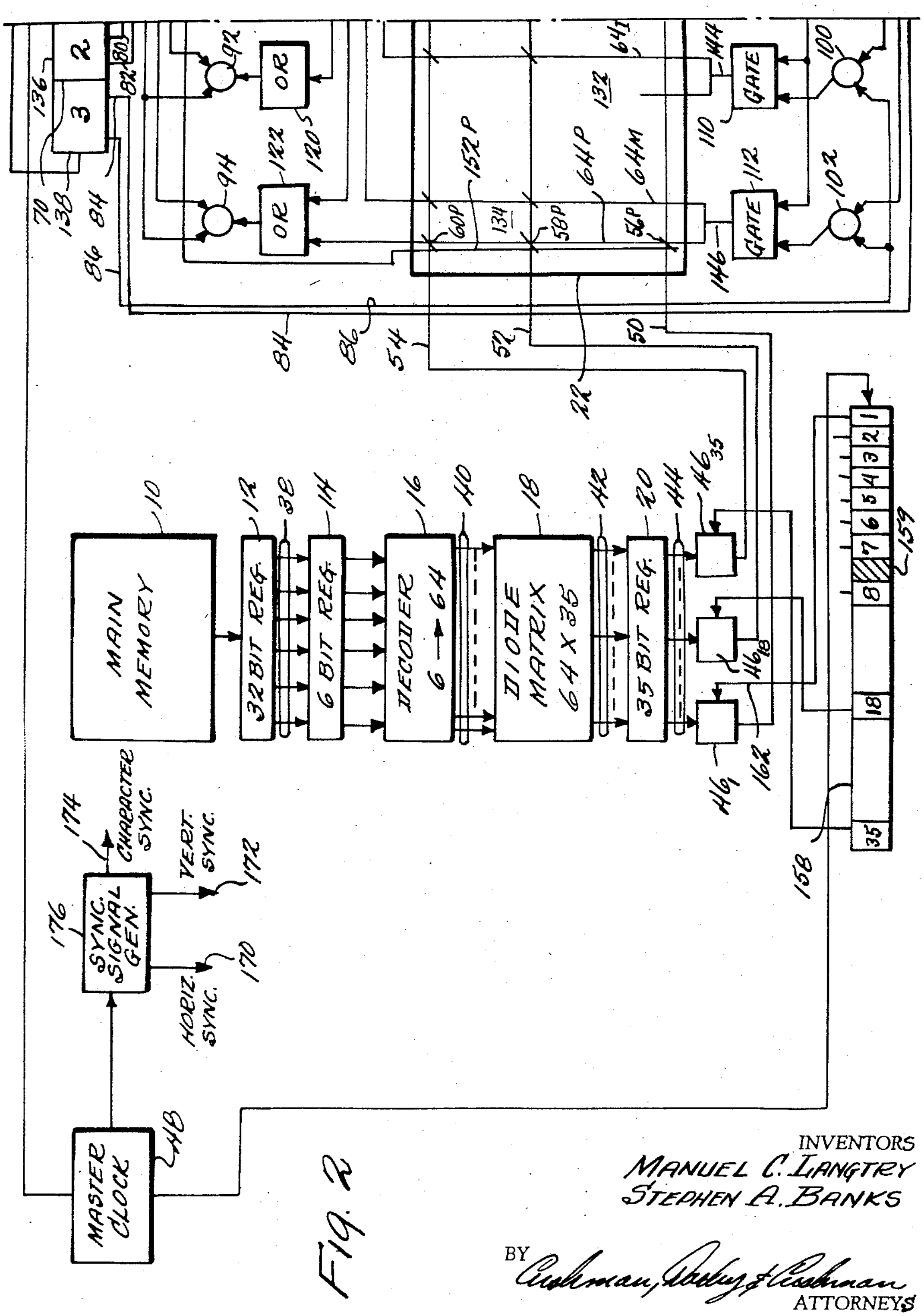
Figure 2A:
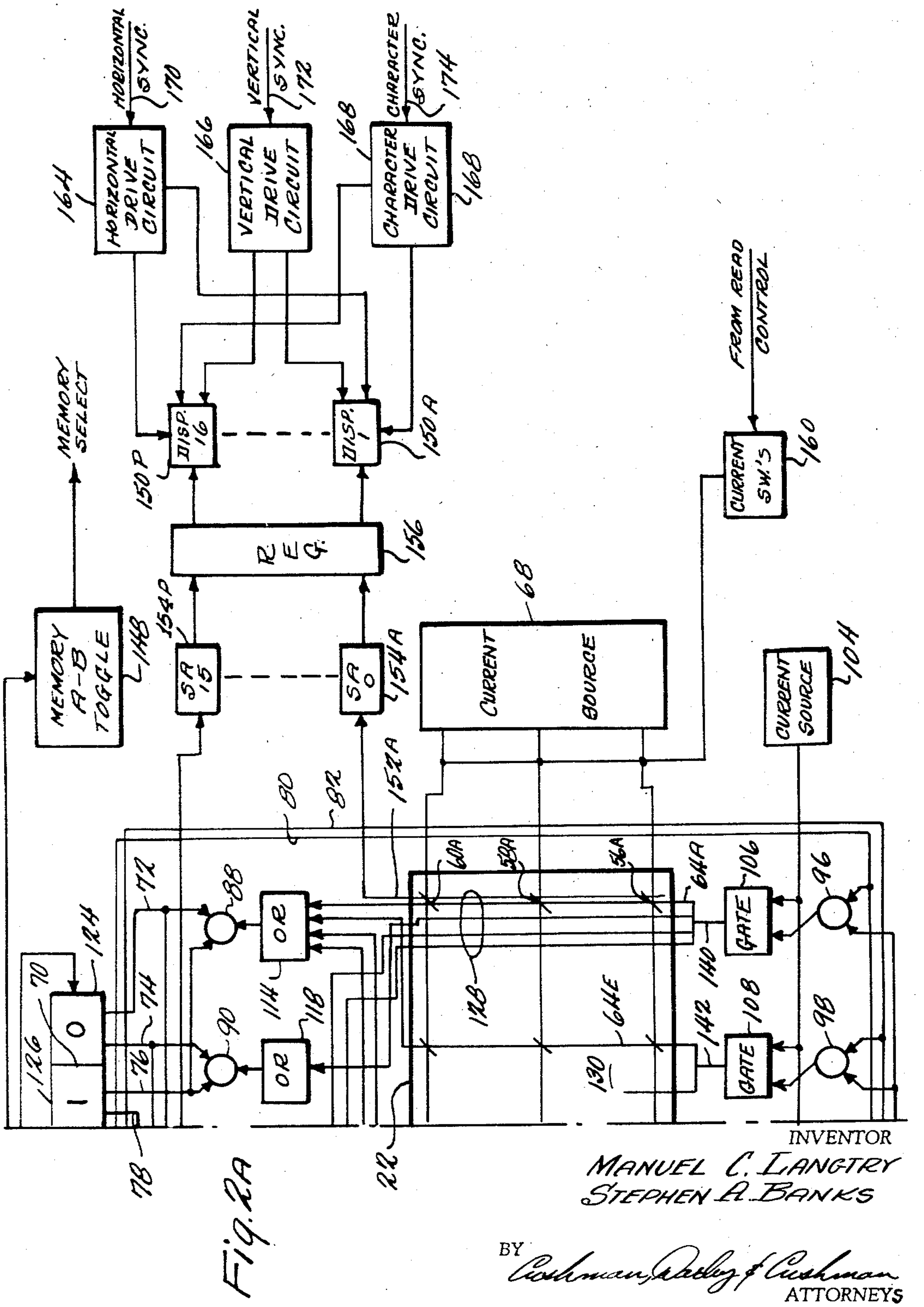

Referring to FIGURES 2 and 2A, there is shown a more detailed block diagram of the overall system than is illustrated in FIGURE 1. Like reference numerals refer to the same blocks or devices in all figures of the drawing. The presence of a bit will be referred to as ONE, and the absence thereof will be referred to as ZERO. As described before, the main memory 10 contains the digital information which is eventually displayed at the sixteen display consoles. This information is transferred to the thirty-two-bit register 12 in blocks containing four words. Six information bits per word are transferred over the lines 38 to the six-bit register 14, the transfer being made one word at a time. Six outputs from the register 14 are presented to the de-coder 16 which has sixty-four outputs. One of these outputs is activated depending on the particular combination of bits at the six inputs to the de-coder 16. For a detailed description of a de-coder suitable for this purpose, see Digital Computer and Control Engineering, by Robert Ledley, McGraw-Hill Book Company, Inc., 1960, pages 547–548. One of the sixty-four outputs 40 from the de-coder 16 will cause the converter 18 to form a unique combination of bits on its thirty-five output lines 42. Although the converter is preferably a diode matrix, a "rope" memory may be employed in some situations. For a discussion of rope memory, see the article "Applications of Rope Memory Devices," Computer Design, August 1964, pages 12–21. Also any of the other permanent storage memories discussed in this article may be employed.

Reference should now be made to FIGURE 7, which shows a diode matrix suitable for converting the output from the de-coder 16 to a thirty-five-bit code or character suitable for representing any character on a cathode ray display tube. The sixty-four input lines from de-coder 16 are indicated at blocks A, B, C . . . X, Y and Z. Each of the input lines coming from the de-coder is uniquely energized—that is, one and only one of these lines can be energized at any given instant of time. The energization of, for example, line A (corresponding to the presentation of the character A to the converter 18) causes the uppermost line 19 to be energized from a current source 21. Gate 17 is conditioned by the activated line A to pass the current from source 21 to the line 19. Output lines $25_1$–$25_{35}$ corresponding to the dots 1 through 35 of a character are shown at the bottom of the matrix.

In FIGURE 8 is shown the representation of the character A as it would appear on a display tube. As stated before, each character consists of a pattern or matrix of 7 x 5 or thirty-five dots or elements. The dots comprising the character A are shown in FIGURE 8 and comprise dots 1 through 6, 10, 14, 17, 21, 24 and 28 through 34. Referring to FIGURE 7, each character has a diode for each dot in its 7 x 5 pattern. In other words, diodes $23_{1-6}$, $23_{10}$, $23_{14}$, etc. connect line 19 to all output lines which correspond to the dots required for character A. Therefore, when line 19 is energized, an output signal will occur on the lines corresponding to the dots shown in FIGURE 8. The manner in which these dots are utilized to generate a character in the display tube will be described in more detail hereinafter. Although thirty-five dots and a 7 x 5 matrix are preferred in establishing a character display on the display tube face, there will be obvious modifications of the particular combination of dots for representing a character apparent to one skilled in this art. An important advantage of the diode matrix is that considerable flexibility is offered in changing a character. This is done by merely adding or deleting some diodes from one of the sixty-four rows.

Reference should now be made to FIGURE 10 which shows an alternative structure for accomplishing the functions of the de-coder 16 and the converter 18 that is, a rope memory. Inhibit registers 180 and 182 are provided, both of these registers storing three bits each. Direct inhibit register 180 corresponds in function to register 14, shown in FIGURE 1—that is, if inhibit register were six bits long, the output from register 12 would be applied to register 180. However, for ease of illustrating the principles of operation of the rope memory, the size of register 180 has been limited to three bits. Inhibit register 182 contains the complement of the word stored in register 180. Eight magnetic cores 184 are provided, the number of cores generally being determined by the expression $2^P$, where P equals the number of stages in the register 180. Register 180 has three stages and, hence, there are eight cores. Associated with each of the bits in the registers 180 and 182 is a driver (not shown) which is enabled if its associated bit is a ONE; one driver is connected to to one inhibit line. Cores 184 are uniquely selected. For purposes of selection, each core is threaded by a selected set of P out of $2^P$ inhibit lines.

A source 186 of SET pulses is connected through each of the cores via SET line 188 to ground 190. The SET line 188 is enabled simultaneously with the inhibit lines 183; the SET and inhibit pulses are of equal amplitude but opposite polarity. The amplitude of each pulse is greater than the switching threshold of the core. The polarity of the SET pulse is such that in the absence of any inhibit pulses it will switch a core fully. The polarity of the inhibit pulses is such as to prevent a core from switching, all cores initially being in the same remanent state. The selected core is not threaded by any of the enabled inhibit lines, and is thus switched by the SET pulses.

A source of RESET pulses 192 is connected over RESET line 194 to ground 190. The RESET pulse is of the same amplitude as the SET and inhibit pulses. Its polarity is such that it will RESET the core that was SET during the selection phase of the rope memory operating cycle. During the read phase, the core output, obtained as a consequence of the application of the RESET pulse, is used to generate the information pattern, which may correspond to the thirty-five output bits from converter 18, shown in FIGURE 1. At the end of the RESET pulse, all cores are again in the same remanent state. Each core may store N bits. This requires the use of N sense lines, there being shown three sense lines 196 in FIGURE 10. In practicing the invention with the embodiment shown in FIGURE 1, there would be thirty-five sense lines associated with the rope memory. N bit characters suitable for display at the console are generated by threading a sense line through a core if the bit to be stored is a ONE; otherwise the core is bypassed by the particular sense line. These lines correspond to ZERO bits, as no output will occur across them when the core is RESET. The sense lines 196 are common to all cores. A given sense line will thread those cores wherein a ONE is to be stored in the bit position represented by that sense line and will bypass those cores wherein a ZERO is to be stored in the bit position represented by that sense line.

Referring to FIGURE 10, the wiring scheme for a word memory of eight words (P equals 3) is shown. Each core stores a three bit word. For a rope consisting of eight cores, there are six inhibit lines 183. Three of these are associated with the direct register 180 and the other three are associated with the complemented register 182.

Assume that the data stored in core or word 010 is to be read out. The operation is as follows. The word 010 is stored in the direct inhibit register 180. Its complement 101 is stored in register 182. During the selection phase, the SET line and the inhibit drivers corresponding to ONE in the registers 180 and 182 are enabled. Core 101 will be SET since none of the enabled inhibit lines are threaded. During the read phase, the RESET line is enabled and the information stored in the core 010 is transferred to an output register 198 via the sense lines. In this case, the word 010 is transferred out over the sense lines 196. It should be noted that in the particular illustration shown in FIGURE 10, the information stored is the address of the word storing it. However, it is obvious that the sense lines may thread any of the cores 184 in any arbitrary pattern to establish the pattern of information stored by a particular core.

Thus it has now been shown how a rope memory operates and how it readily lends itself to the combined function of the de-coder 16 and the converter 18. In some applications, this may result in reduced space requirements for these functions.

Reference should now be made to FIGURE 2. The output from the converter 18 is presented over the thirty-five lines 42 to the thirty-five bit register 20. The register 20 is loaded about 1 micro-second after the loading of register 14. This permits sufficient time for de-coding off of register 14 and the output of the diode matrix to stabilize before gating into register 20. Register 20 has thirty-five output lines 44 respectively corresponding to each bit stored therein. Each output line 44 is respectively connected to thirty-five switches $46_1$–$46_{35}$. The switches are also respectively connected to the thirty-five stages of a read sequence counter 158, which is used to control the unloading of data from memory 22. This will be explained in more detail hereinafter. While data is being written into memory 22; switches $46_1$–$46_{35}$ are connected to lines 44. The output lines shown in the drawing correspond to the zero bit, the seventeenth bit, and the thirty-fourth bit contained in register 20, the intervening output lines not being shown. The thirty-five bits contained within the register 20 are written into the memory 22 after each six-bit word is processed from the register 14.

The timing network for controlling the repetitive processing of the input data to the memory 22 is not shown, however, it is understood that it would be well within the capabilities of one skilled in this art to derive the proper timing signals from the master clock 48 which controls the timing of operations within the computer.

The memory 22 has thirty-five input or bit lines indicated at 50, 52 and 54. These lines respectively may be, for example, associated with the zero seventeenth and thirty-fourth bit of register 20, the intervening lines into memory 22 not being shown. The cores 56, 58 and 60 correspond to these bits of register 20, these cores contributing to the first thirty-five-bit core location within the memory 22. Since it is assumed that sixteen displays are employed in this illustrative embodiment of the invention, there are sixteen thirty-five-bit characters that must be loaded before each of the displays can be actuated.

For a better understanding of the write operation into memory 22, reference should now be made to FIGURE 9. In order for a particular core in the memory 22 to be set to ONE, a write current in the direction as shown at 62 in FIGURE 9 must be generated in one of the sixteen write lines 64A–64P vertically extending through the memory 22. If it is desired to write in the first word, line 64A must be energized with a write current as shown at 62 in FIGURE 9. This write current may be typically 500 milliampere-turns.

At the same time that the write current is present in line 64A, an inhibit current as shown at 161 in FIGURE 9 must also be present at any core that stores ZERO. Therefore, at the input lines 50 through 54 an inhibit current is present on those lines which are not to be set thereby cancelling out the effect of the write current at the particular core location. Because of the particular method employed in writing information into the memory 22, the inhibit current is turned on by an appropriate timing signal derived from master oscillator 48, before the write current is turned on and remains on after the write current is turned off. This insures that the write current will not erroneously set any core location to ONE. The current source 68 supplies the inhibit current and a return path to the current source 68 is provided through the switches 46 which have been turned on by a ZERO at the associated bit of register 20. The inhibit current is typically a half-select current or 250 milliampere turns, the write current being a full-select current and opposed in direction to the inhibit current.

In order to more fully understand how memory 22 is loaded, reference should now be made to write counter 70 in FIGURE 2. This counter is under the control of the master clock 48 of the computer. Counter 70 is a four-stage counter which controls which of the write lines 64A–64P shall be selected during the loading of the thirty-five-bit words from register 20. The outputs 72 through 86 of this counter are combined at AND gates 88 through 94 and AND gates 96 through 102 to regulate the selection of write lines. Current source 104 is gated through one of the gates 106 through 112 through one of the write lines 64A–64P to OR circuits 114 through 122. The return current path back to current source 104 is completed through one of the AND circuits 88 through 94.

To summarize the write operation: The writing in of sixteen thirty-five-bit words is accomplished in a word-organized manner in that successive thirty-five-bit words are presented on the bit lines represented by lines 50–54 of the plane 22 while the appropriate word line is selected by the write counter 70. The inhibit current is a half-select current and opposes the full-select write current. Because the write current is a full-select current, the inhibit current must be established before and last beyond the period of the write current.

As an illustrative example of how the write counter 70 selects a particular write line 64A–64P, assume that counter 70 is set in the ZERO position, this would mean that output lines 72, 76, 80 and 84 (which are all connected to the ZERO side of the four-stages or flip-flops comprising write counter 70) would have voltage levels thereof indicative of the ZERO setting of counter 70. Particularly, lines 72 and 76 would have voltage indicative of the ZERO setting, these lines are fed to the AND circuit 88, which is responsive to this particular setting of the first two stages 124 and 126 of write counter 70—that is, when stages 124 and 126 are both set to ZERO, the AND gate 88 is conditioned to pass an output from OR circuit 114.

The sixteen write lines 64 vertically passing through memory 22 are grouped into four groups 128, 130, 132 and 134, each group comprising four write lines. OR gates 114–122 are respectively connected to the first, second, third, and fourth write lines of each of the groups 128–134.

As assumed above, the counter 70 is sitting in the ZERO position, this means that that write line 64A is to be selected, this in turn means that gate 106 and AND gate 88 must be conditioned in order for current to pass from the source 104 through the selected write line and return to the source 104. As stated hereinbefore, AND gate 88 is conditioned when the first two stages of the write counter 70 both have their ZERO outputs activated. AND gate 96 is connected to the ZERO outputs of stages 136 and 138 of counter 70—that is, the two uppermost stages of the counter. These two stages control which of the gates 106–112 will be conditioned to pass current from the source 104. The outputs of gates 106–112 are respectively connected to the groups 128–134 of write lines through wires 140–146. Since the ZERO outputs from the stages 136 and 138 are connected to AND gate 96 and since the counter 70 is sitting in ZERO position, AND gate 96 will provide a output gating voltage for gate 106 thereby passing current from source 104 over line 140 to group 128. Further since stages 124 and 126 of write counter 70 are also sitting in the ZERO position AND gate 88 will be conditioned to pass an output from OR gate 114 as described before. The four write lines 64A, 64E, 64I and 64M will cause an output voltage to occur from OR gate 114 when any of these lines are energized. As stated before, all of the wires of group 128 are energized when gate 106 passes current from source 104. This, of course, means that line 64A at the input to OR gate 114 will be energized, thereby providing a return path to source 104 for the energization current through write line 64A.

The content of write counter 70 is incremented by one each time a thirty-five-bit word is loaded into the memory 22 by a signal derived from the master clock 48. For example, after the write line 64A is energized (during loading of the first word into the memory 22), the second line 64B is energized. The energization of line 64B is accomplished in a manner similar to that one described for 64A. The counter contains the number one after the first word has been loaded. Therefore, the ONE output 74 and the ZERO output 76 are energized, thereby conditioning AND gate 90 to pass the output of OR gate 118. Line 64B is one of the inputs to OR gate 118 and therefore the energization of gate 106 permits current from source 104 to pass through line 64B, OR gate 118 and AND gate 90 and return to the current source 104.

Each line 64A through 64P is energized sequentially in the manner described above as the counter 70 progresses through its sixteen states.

After the sixteenth state has been reached (that is, the counter 70 containing the number 15), the memory toggle 148 is switched in response thereto, thereby conditioning the corner-turner memory 24 (not shown in FIGURES 2 and 2A) to receive data from register 20. While memory 24 is being loaded, memory 22 is unloaded, the output data being transferred to the sixteen displays 150A through 150P. Memory 22 is unloaded in what is known as a "corner-turning" fashion, "corner-turning" meaning that reading is done along the bit or digit lines after writing along the word lines.

Each core within the memory 22 encloses three wires: the write wire, the inhibit wire and the sense wire. The write wires 64A through 64P and the inhibit wires suggested by wires 50, 52 and 54 have already been described. The sense wires 152A through 152P are respectively connected to sense amplifiers 154A through 154P. The outputs of the sense amplifiers are fed in parallel to register 156. Register 156 acts as a distributor which distributes the data to the sixteen displays 150A through 150P.

A read control register or read sequencer 158 controls the read operation from the memory 22. The read sequencer 158 is used to control the sequential accesses for unloading the core plane, as described before. It may be a baud counter in that the first flip-flop is used to set the second, the second to set the third, etc.

Register 158 may be a thirty-nine bit or stage register which is set to ZERO when the read operation commences, which is sensed when the memory toggle 148 switches. Each time a word is read out of the memory 22, register 158 is incremented by one by a signal derived from the master oscillator 48, the content of register 158 determining which word is read out. Nothing is read out of the memory 22 when the register contents are eight, sixteen, twenty-four or thirty-two. Note there is no output connection from the eighth stage 159. The reason for this will be explained hereinafter. The important thing to note at this time is that there are thirty-five outputs from counter 158 (connected to stages 1–7, 9–15, 17–23, 25–31 and 33–39), thereby enabling the counter 158 to control output from the memory 22 (or 24 as the case may be) thirty-five times.

Reference should now be made to FIGURE 9 which shows the hysteresis curve for a typical core element within the memory 22. For the read operation a read current is passed through each core, the contents of which are to be sensed. Any core set to the ONE state will be switched to the ZERO state, thereby causing a voltage to be induced into the sense winding passing through that particular core. The read operation is destructive thereby permitting error free loading of the memory 22 the next time it is loaded.

Current switch 160 is actuated during the read operation to cause a full-select read current to be delivered by current source 68. This is twice the amount of current it delivers during the write operation and in the same direction. As noted at 161 in FIGURE 9 this amount of current is necessary to insure a switch over in a core containing a ONE. All cores containing a ZERO will, of course, remain uneffected when the write current is passed therethrough. When writing, the current switch 160 is turned off, thus permitting only a half-select current in the bit lines 50–54. The half-select current is caused by switching parallel resistors into the output of the current source 68. The switch 160 is actuated from the toggle switch 148 (not shown) when readout from memory 22 commences.

An illustrative example will now be given showing how data is unloaded from the corner-turner memory and delivered to the displays 150A to 150P. Assuming that the register 158 is in the ZERO position (as will be the case when the read operation commences), a gating voltage is applied over line 162 to switch 46 which is switched during the read operation to pass read current over line 50 from current source 68 through the switch 46 and then over a return path (not shown) to source 68. The passage of current through cores 56A through 56P causes the first bit of each of the sixteen thirty-five-bit characters loaded into the memory 22 during the write operation to be sensed. Assuming that the core 56A had been set to a ONE during the write operation, a voltage would be induced in line 152A, amplified in sense amplifier 154A and then loaded into the first stage of register 156. The similar thing would happen in the remaining cores 56B–56P, which were set to ONE.

After the first bit of each of the sixteen thirty-five-bit characters has been read, the counter 158 is incremented by one and the second stage of counter 158 exerts control over the second read line (not shown) horizontally passing through memory 22. In this manner the second bit of each of the sixteen thirty-five-bit characters is sensed by the sense lines 152A through 152P. This continues in a sequential manner until thirty-five bits have serially passed over the lines 152A–152P, where the thirty-five bits on each line represent a character which will be displayed on the console associated with a particular line.

In order to provide ping-pong operation of the memories 22 and 24, a bank of switches similar to $\mathbf{46_1}$–$\mathbf{46_{35}}$ may be provided to insure that the output of register 20 is transferred to memory 24 while the contents of register 158 controls memory 22. The operation of these switches would, of course, be, directly or indirectly, under the control of the toggle switch 148.

As each bit is loaded into the register 156, it is immediately transferred to the unblanking or intensity control element of the cathode ray tubes at the display consoles 150A through 150P. As can be seen from the above description of the read operation from memory 22, each bit of the sixteen thirty-five-bit characters will act in synchronism at the sixteen displays—that is, the first bit of each thirty-five-bit character will act at sixteen displays simultaneously. This will also occur for the second bits and so on.

In order to more fully understand how each character is represented at a display, reference should first be made to FIGURES 2 and 2A.

At FIGURE 2A is shown the main horizontal drive circuit 164, a frame or main vertical drive circuit 166 and a character vertical drive circuit 168. The drive signals from circuits 164 and 166 are respectively applied to the main horizontal and vertical controls of the cathode ray tube in the conventional manner. The drive signal from the character vertical drive circuit 128 is applied to the diddle yoke or control yoke of each of the sixteen cathode ray tubes. The diddle yoke is normally placed around the tube and rearwardly of the main winding. Energization of the diddle yoke causes either a horizontal or vertical deflection to be superposed on the deflection caused by the main control. The positioning on the tube of the diddle yoke determines whether the horizontal or vertical deflection is effected. In the preferred embodiment now being described, the vertical signal is effected or "diddled."

In FIGURE 2A drive circuits 164 through 168 are indicated as being common drive circuits for all sixteen of the displays, the synchronization for these circuits being respectively applied from lines 170 through 174. The synchronizing signals are generated by a synchronizing signal generator 176 which operates under the control of the master clock 148. See Pulse and Digital Circuit, Millman and Taub, McGraw-Hill, 1956, pp. 527–532, for a typical synchronizing signal generator. Also see Millman and Taub, pp. 355–360, for synchronization of the wave form generators 164–148.

The illustrative embodiment of the invention is typically organized around a basic character time of 28.8 microseconds. This is the time to completely paint or display a 7 x 5 character plus the time to move the beam to the next character position. For a raster of $40\times25$ or 1000 characters, a period of $1000\times28.8$ microseconds for painting plus $25\times3\times28.8$ microseconds for horizontal and vertical flyback must elapse for a total page time. The refresh rate thus becomes $\frac{1}{30.96}$ millisecond or about 32 frames per second. This will give a satisfactory presentation using certain standard phosphors.

The main horizontal positioning signal is an analog ramp as shown in FIGURE 3. The ramp is applied to the X winding of the main positioning yoke. The main vertical positioning signal is an analog staircase as shown in FIGURE 4. The staircase is applied to the Y winding of the main positioning yoke. The combined effect of these two signals is to move the beam continuously in a TV-like manner along a horizontal line from left to right across the cathode ray tube and at the end of the line to make a downward vertical step and retrace to the beginning of the next line. At the end of the twenty-fifth line, there is an upward vertical retrace to the beginning of the first line.

Figures 5, 6:
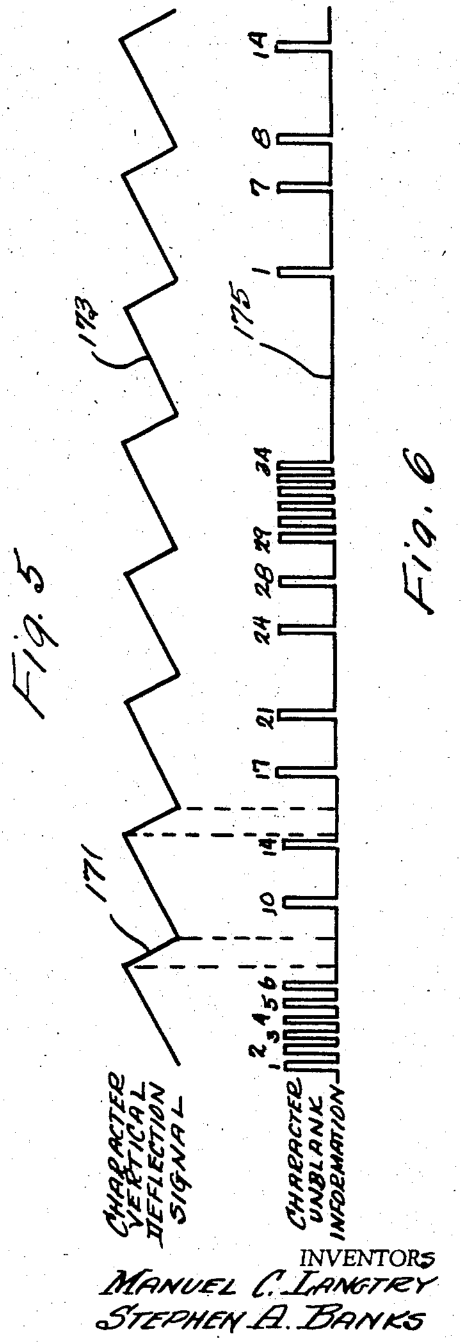
FIGURE 5 is a further ramp waveform employed in conjunction with waveforms shown in FIGURES 3 and 4 to produce the necessary control for generating a character at the display tube.
FIGURE 6 is a further waveform used in the invention in conjunction with the waveforms used in FIGURES 3–5.

The character vertical deflection signal, as shown in FIGURE 5, is applied to the diddle yoke located behind the main positioning yoke. The effect is to produce a vertical upward stroke during which the beam is blanked and unblanked "on the fly" to produce one stroke of seven dots in the 7 x 5 dotted character, see 169 of FIGURE 8. After the seventh dot has been painted and is retraced to the bottom of the character in preparation for the next upward stroke, see 171 of FIGURE 5, another stroke is commenced. Five upward strokes of seven dots each are required to completely paint the 7 x 5 character. One stroke and retrace during which no unblank information is sent is allowed as a space between the characters, see 173 and 175 of FIGURES 5 and 6 respectively. The result of adding the vertical character strokes to the horizontal ramp produces characters which have a slight but not objectionable slant to the right. In order to insure that no unblank information is sent during the retrace between strokes of each character, the eighth, sixteenth, etc. stages of the counter 158 of FIGURE 2 have no output connections therefrom—for example, there is no output from stage 159 of counter 158.

Referring to FIGURE 3, each analog ramp of the horizontal deflection signal typically consumes forty character times during one horizontal trace or $40\times28.8$ microseconds. Three character times are allowed for retracing the horizontal signal. Simultaneously, the main vertical detection signal is stepped down one increment during the three character retrace time to allow positioning of the next line of characters below the line above it, see FIGURE 4.

An alternative scheme for generating a character within a character space is as follows. Instead of using a vertical character deflection signal (as shown in FIGURE 5) superimposed on top of the main vertical scan as shown in FIGURE 4, horizontal and vertical signals are superimposed on top of the main horizontal and vertical positioning signals respectively, the diddle yokes being appropriately positioned. The main horizontal positioning signal would be an analog staircase as shown in FIGURE 11, having forty steps per line. The main vertical positioning signal would be a staircase as shown in FIGURE 4. The horizontal and vertical character signals are respectively shown in FIGURES 12 and 13. The timing of the waveforms shown in FIGURES 11, 12 and 13 has been coordinated to illustrate the actual relations between these waveforms that could be employed in a working embodiment of the invention. During each incremental horizontal ramp five dots are painted for each of the seven steps of vertical character signal and after each character has been painted the main horizontal staircase is incremented by one step as shown in FIGURE 11, thereby permitting the painting of the next character. The combined effect of the two character deflection signals shown in FIGURES 12 and 13 is to move the beam continuously from left to right along the horizontal stroke in a character space where five dots are painted. At the end of the horizontal stroke, the vertical character signal (FIGURE 13) is incremented by one step and the horizontal ramp retraces to the left hand side of the character. This process continues for seven strokes at which time the vertical staircase is reset to the first step in preparation for painting the next character. A pictorial of the beam movement is shown in FIGURE 14.

With this approach both an X and Y winding on the diddle yoke are required to accommodate the $\Delta X$ and $\Delta Y$ diddle signals whereas in the preferred embodiment described hereinbefore, only one winding for the $\Delta Y$ signal is required. However, the $\Delta X$ and $\Delta Y$ approach does produce characters which do not have a slant to the right, the slant in the preferred embodiment being unobjectionable for most applications.

The signal delivered from the symbol generator 11 for the alternative embodiment described hereinbefore would remain the same as that described above for the preferred embodiment, except for the order in which dots would be presented to the display consoles. It is a simple matter of design to insure that the order of the bits from memory 22 would be appropriate for a combined horizontal and vertical character scan and well within the scope of one having ordinary skill in the art of computer design.

Returning to the description of the preferred embodiment, reference should now be made to the vertical character deflection signal shown in FIGURE 5 and the unblank signals shown in FIGURE 6 which would result from the conversion (by converter 18) of the character A. During the first upward stroke of the vertical character deflection signal, dots 1–6 are painted, dot 7 not being painted because the converter 18 does not provide an output for this element when the input character is A. (The time scale for FIGURES 5 and 6 is the same.) During the retrace time of the vertical character deflection signal, no unblank information is present—that is, during the time necessary to retrace the character vertical deflection signal, the counter 158 provides no output control signal to the switches $46_1$–$46_{35}$. The total time for one upward stroke and retrace of the character vertical deflection signal is 4.8 microseconds. Five upward strokes and an additional stroke between the characters establishes the basic character time, that is, $6\times4.8$ microseconds or 28.8 microseconds, as stated before.

The read cycle is divided into five 4.8 microsecond periods. Each period represents one upward stroke of seven dots and a downward retrace prior to starting the next stroke.

Eight flip-flops of sequencer 158 are related to each 4.8 microsecond period. Each flip-flop is set for 0.8 microsecond. However, the trailing edge of one overlaps the leading edge of the next by 0.2 microsecond so effectively each flip-flop times a 0.6 microsecond interval. Eight 0.6 microsecond intervals equal the 4.8 microsecond period.

As stated above, each sequencer flip-flop is set for 0.8 microsecond which is the length of time the read current is passed through the bit line. However, since another flip-flop is set every 0.6 microsecond, the unload rate is one dot per 0.6 microsecond or 1.7 megacycles/second during any vertical stroke. Each read access retrieves one dot for each of sixteen displays. Thirty-five accesses require 5×4.8 or 24.0 microseconds which is the total character writing time. One 4.8 period is allowed between characters so the total character time becomes 28.8 microseconds, as stated before. The output of the register 156 becomes the thirty-five dot video pulse train which is fed to each display in synchronism with the horizontal, vertical, and character positioning signals.

To summarize the read operation: The read operation is accomplished by thirty-five sequential accesses, each access retrieving sixteen bits. The read current is a single full-select current in the bit line which is in the same direction as the inhibit current when writing. The outputs of the accessed cores are amplified and gated into the register 156. The register 156 output is the serial video train which is sent to each display.

Thus there has now been described apparatus for displaying digital information contained at M storage elements (these elements corresponding to the different storage areas within the main memory 10 which are respectively associated with a plurality of visual displays), where M in the illustrated embodiment equals sixteen and corresponds to the number of displays where simultaneous presentations of data are made. At each display console there is a cathode ray display tube having an intensity control element and horizontal, vertical and character positioning yokes. Means (de-coder 16 and converter 18) for converting the P bit words to N bit characters is provided. The N bit characters are suitable for display at the said tubes on a character space comprising an A x B matrix where in the illustrated embodiment A equals 7 and B equals 5. Further, there are typically forty characters per line and twenty-five lines per raster thereby resulting in one thousand character spaces or characters per raster.

Means (memories 22 and 24) responsive to the converter are also provided. Although the illustrative embodiment has been described in terms of two memories being employed, this is not a limitation on the invention as pointed out hereinbefore since one corner-turner memory can be employed if the number of displays is small enough and the required refresh rate is low enough, etc. As pointed out before, applicants' choice of a 7 x 5 matrix lends itself to the representation of all characters in a fifty character set, and therefore this representation is particularly well suited for economical representation of data at the cathode ray display tube.

Means (including read sequencer 158, sense amplifiers 32 and 34 and register 36) are also provided for serially transferring the data from the storage means 22 and 24 to the display consoles. The data within memories 22 and 24 may be N bits long where the converter converts the P bit words to N bit characters where N in the illustrative example of the invention equals thirty-five. The means for serially transferring the N bits of each N bit word respectively to the said M display tubes preferably causes each of the said N bits to be transferred simultaneously—that is, the first bit of each of the N bit words is transferred in parallel or simultaneously to the display tubes and then the second bit of each N bit words is simultaneously transferred and so forth.

Means (horizontal drive circuit 164, vertical drive circuit 166, and character positioning circuit 168) for driving the horizontal, vertical and character positioning windings are provided in timed relation with each of the N bits applied to the intensity control element, the positioning signals establishing the location of a character space at the display tube. Recalling that the character space comprises an A x B matrix of dots or elements, the purpose of the character positioning signal is to cause in the illustrated embodiment B upward strokes, A dots long which are painted for each character space at the display tube. The signal generated by the horizontal drive circuit is an analog horizontal ramp which characterwise is forty characters long thereby establishing forty characters per line at the display tube. The vertical positioning signal is an analog staircase upon which is superposed the character positioning signal. All of these signals are synchronized or in time relationship with the intensity control signal to thereby cause the generation of a character as each character space is scanned as described hereinbefore.

The symbol generator 11 includes the converter 18 and the memories 22 and 24 broadly described above. The generator operates in conjunction with the positioning signals to generate the desired character at the display tube.

The memories 22 and 24 may operate in a ping-ping fashion as described hereinbefore. Means (toggle switch 148 together with master clock 48) for controlling this ping-pong operation have been provided and described.

An N bit register (register 20) is responsive to the converter 18 and acts as an input register for the memories 22 and 24.

De-coder 16 is also provided as a means for interpreting the contents of register 14. The de-coder generally has P inputs and Q outputs, where one and only one of the Q outputs is energized, depending on the combination of bits present on said P inputs, Q being equal to the number of symbols available to said display console. P in the illustrative embodiment is equal to 6 and Q is equal to 64 as a maximum and typically 50 which corresponds to the number of symbols in the symbol sets.

The converter 18 has, generally speaking, Q inputs and N outputs where Q and N have been defined above. A given combination of output bits will occur on the N outputs from converter 18 depending on which one of the Q input lines is energized.

The rope memory, described with respect to FIGURE 10 hereinbefore, also serves as a converter having P inputs and N outputs. The above-mentioned N bit register (register 20) has N input lines respectively responsive to the N outputs from this converter. There is also an output line from each stage of register 20 respectively associated with N inhibit or second drive lines (lines represented by 50, 52, and 54) of the storage means 22 or 24. Also associated with these storage means are M write or first drive lines (lines 64A and 64P) and N x M storage elements where each element has an inhibit and write line associated therewith as described hereinbefore.

Means (write counter 70) for controlling the sequential storage of the N bit words from register 20 are also provided. This counter determines which of the M write lines is activated. M sense lines (lines 152A–152P) are also respectively associated with the storage elements and with the M display consoles.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

What is claimed is:

1. Apparatus for displaying digital information contained at M storage elements, each element being P bits long, respectively at M display consoles, said consoles including cathode ray display tubes having horizontal, vertical and character positioning control elements, said apparatus comprising:

means for respectively sequentially converting the P bit words contained in said P bit storage elements to N bit characters suitable for display at said tubes in a character space comprising an A x B matrix of dots;

means for serially transferring the N bits of each N bit character respectively and simultaneously to said M display tubes;

means for driving said horizontal, vertical and character positioning control elements respectively with horizontal, vertical and character positioning signals in timed relation with each of said N bits to establish the location of said character space at said display tube; and wherein said horizontal positioning signal is a first analog ramp and said vertical positioning signal is an analog staircase and said character positioning signal is a second analog ramp which is superimposed on said vertical positioning signal to cause A of said dots to be painted at said display tube for each sweep of the second ramp.

2. Apparatus as in claim 1 where said character positioning signal causes B upward strokes A dots long to be painted for each character space at the said display tube.

3. Apparatus as in claim 1 including means for preventing any of the N bits from being transferred to said display during the retrace time of said character positioning signal.

4. Apparatus as in claim 1 where said horizontal positioning signal is a first analog staircase, and said vertical positioning signal is a second analog staircase and where said character positioning signals include an analog ramp which is superimposed on said first analog horizontal positioning staircase signal to cause B of said dots to be painted at said display tube for each sweep of the ramp, said character positioning signals including a third analog staircase which is superimposed on said second analog vertical positioning staircase signal to cause A horizontal strokes B dots long to be painted for each character space at the said display tube.

5. Apparatus as in claim 2 where B equals 5 and A equals 7.

6. Apparatus as in claim 2 where the sweep of the first horizontal ramp is X characters long thereby establishing X characters per line at the display tube.

7. Apparatus as in claim 6 where said analog staircase signal has Y steps thereby establishing Y lines per page or raster at the display tube and thus establishing an X x Y page of characters at said display tube.

8. Apparatus as in claim 7 where X equals 40 and Y equals 25.

9. Apparatus as in claim 4 where B equals 5 and A equals 7.

10. Apparatus as in claim 4 where the said first analog staircase has X steps per cycle, thereby establishing X characters per line at the display tube.

11. Apparatus as in claim 10 where said second analog staircase signal has Y steps, thereby establishing Y lines per page or raster at the display tube, and thus establishing an X x Y page of characters at said display tube.

12. Apparatus as in claim 11 where X equals 40 and Y equals 25.

13. A symbol generator for delivering digital information to a cathode ray display tube for controlling the intensity control element thereof, said generator being responsive to information in a storage element P bits in length, said generator comprising:

means for converting the P bit word to an N bit character suitable for display in a character space comprising an A x B matrix of dots at the said display tube;

de-coder means having P inputs and Q outputs where one and only one of said Q outputs is energized depending on the combination of bits present on said P inputs, Q being equal to the number of symbols available to said tube; and where said converting means has Q inputs respectively responsive to the Q outputs of said decoding means and N outputs where a given combination of output bits will occur on said N output lines depending on which of said Q input lines is energized.

14. A symbol generator as in claim 13 where Q equals 64 and N equals 35.

15. A symbol generator as in claim 13 where said converting means is a diode matrix having Q inputs and N outputs where each of said Q inputs is connected to some of said N outputs by said diodes, a given input line corresponding to a unique character in said character space, said given input line being connected to those output lines of the N output lines which correspond to said unique character.

16. A symbol generator for delivering digital information to a cathode ray display tube for controlling the intensity control element thereof, said generator being responsive to information in a storage element P bits in length, said generator comprising:

means for converting the P bit word to an N bit character suitable for display in a character space comprising an A x B matrix of dots at the said display tube;

means for transferring the said N bit character to the said control element; wherein said converter means is a rope memory where each of the cores thereof respectively correspond to the characters displayed in said character space.

17. A symbol generator as in claim 16 where the inhibit registers of said rope memory each contain P bits and where there are N sense lines associated with said rope memory.

18. A symbol generator for supplying digital information to a plurality of cathode ray display tubes from a plurality of storage means respectively associated with said display tubes, said apparatus comprising:

means for converting the digital information to a representation suitable for visual display;

at least two storage means responsive to said converting means, each for storing all of the converted representations destined for said plurality of display tubes;

means for serially transferring simultaneously the bits of each converted representation to said display tubes from said storage means so that all tubes may simultaneously display different information from one another; and means for controlling the storage of said representations into at least one of said storage means while simultaneously controlling the transfer of said representations out of the other of said storage means to said display tubes.

19. A symbol generator for generating and delivering digital information as intensity control information to M display consoles, each console including a cathode ray display tube where a character space at a tube is a matrix comprising A x B dots or elements and the data to be displayed is stored at M registers respectively associated with said M display consoles, each of said M registers being P bits long, said symbol generator comprising:

means for converting the P bit words into characters N bits long;

two storage means responsive to said converting means, each for storing M of said N bit characters said characters being transferred from said converting means;

means for transferring the M, N bit characters respectively to said M display consoles from said storage means; and means for controlling the storage of said M, N bit characters into one of said storage means while simultaneously controlling the transfer of said M, N bit characters to said display consoles from the other of said storage means.

20. A symbol generator as in claim 19 were said transferring means simultaneously transfers each of the N bits of the M characters so that all M consoles simultaneously present different information from one another.

21. A symbol generator as in claim 20 where the transfer of the M, N bit characters into one of said storage means and the transfer of the M, N bit characters out of the other of said storage means progresses in a ping-pong fashion as data is transferred from said P bit storage elements to said display consoles.

22. A symbol generator as in claim 20 including an N bit register responsive to said converting means, said storing means being responsive to said N bit register.

23. A symbol generator as in claim 22 including decoder means having P inputs and Q outputs where one and only one of said Q outputs is energized depending on the combination of bits present on said P inputs, Q being equal to the number of symbols available to said display consoles.

24. A symbol generator as in claim 23 where said converting means has Q inputs respectively responsive to the Q outputs of said de-coding means and N outputs where a given combination of output bits will occur on said N output lines depending on which one of said Q input lines is energized.

25. A symbol generator as in claim 24 where said N bit register has N input lines respectively associated with each stage thereof and responsive to the N output lines from said converting means;

said N bit register having N output lines respectively associated with each stage thereof.

26. A symbol generator as in claim 25 where said storage means has N inhibit lines respectively associated with the N outputs from said N bit register and M write lines respectively associated with the said M display consoles, said storage means further including N x M storage elements where each element has an inhibit and write line associated therewith.

27. A symbol generator as in claim 26 including means for controlling the sequential storage of said N bit characters from said N bit register to said storage means over said N inhibit lines;

the said control means determining which of said M write lines is activated.

28. A symbol generator as in claim 26 including M sense lines respectively associated with said storage elements and said M display consoles.

References Cited

UNITED STATES PATENTS

| | | | |
|---|---|---|---|
| 2,920,312 | 1/1960 | Gordon et al. | 340—174 |
| 3,020,525 | 2/1962 | Garrison et al. | 340—172.5 |
| 3,222,667 | 12/1965 | Woroncow et al. | 340—324 |
| 3,256,516 | 6/1966 | Melia et al. | 340—172.5 |
| 3,293,614 | 12/1966 | Fenimore et al. | 340—172.5 |
| 3,298,013 | 1/1967 | Koster | 340—324 |
| 3,302,179 | 1/1967 | Osborn et al. | 340—172.5 |
| 3,305,841 | 2/1967 | Schwartz | 340—172.5 |
| 3,307,156 | 2/1967 | Durr | 340—172.5 |
| 3,323,119 | 5/1967 | Barcomb et al. | 340—324 |
| 3,329,947 | 7/1967 | Larrowe et al. | 340—324 |
| 3,332,071 | 7/1967 | Goldman et al. | 340—172.5 |
| 3,346,853 | 10/1967 | Koster et al. | 340—172.5 |

GARETH D. SHAW, *Primary Examiner.*

U.S. Cl. X.R.

340—324.1